US005652754A

United States Patent [19]
Pizzica

[11] Patent Number: 5,652,754
[45] Date of Patent: Jul. 29, 1997

[54] SIGNATURE ANALYSIS USAGE FOR FAULT ISOLATION

[75] Inventor: Stephen V. Pizzica, San Pedro, Calif.

[73] Assignee: Hughes Electronics, Los Angeles, Calif.

[21] Appl. No.: 579,523

[22] Filed: Dec. 27, 1995

[51] Int. Cl.$^6$ ............................ G01R 31/28; G06F 11/00
[52] U.S. Cl. ................. 371/22.4; 371/25.1; 371/67.1; 395/183.2; 395/184.01
[58] Field of Search .................. 371/22.4, 22.5, 371/26, 23, 25.1, 27, 67.1; 395/183.09, 183.16, 183.2, 184.01

[56] References Cited

U.S. PATENT DOCUMENTS

| | | | |
|---|---|---|---|
| 3,851,161 | 11/1974 | Sloop | 371/25.1 |
| 4,503,536 | 3/1985 | Panzer | 371/25.1 |
| 4,601,033 | 7/1986 | Whelan | 371/25.1 |
| 4,791,359 | 12/1988 | Raymond et al. | 371/22.4 |
| 4,801,870 | 1/1989 | Eichelberger et al. | 371/22.4 |
| 5,081,626 | 1/1992 | Scott | 371/22.4 |

Primary Examiner—Robert W. Beausoliel, Jr.
Assistant Examiner—Trinh L. Tu
Attorney, Agent, or Firm—Leonard A. Alkov; Wanda K. Denson-Low

[57] ABSTRACT

Test equipment and test methods employing signature analysis to achieve fault isolation of digital modules. Fault free signatures and faulty signatures of a digital module are stored in a lookup table that are derived from physical measurement or simulation of all components thereof. Test input signals are then applied to a digital module under test, and outputs and test points thereof are applied to a multiple input shift register signal analyzer. The multiple input shift register signal analyzer performs pass/fail signature analysis using the applied signals. Test inputs from a source (either on-board the module or external thereto) are applied to the digital module under test. When a failure occurs during testing of the digital module under test, comparator circuitry is used to find a corresponding signature match with the stored faulty signatures. A message is then sent as an output from the comparator circuitry identifying the failed node so that the digital module under test can be repaired. The present invention does not require expensive automatic test equipment and therefore provides a more cost-effective approach to failure analysis.

4 Claims, 3 Drawing Sheets

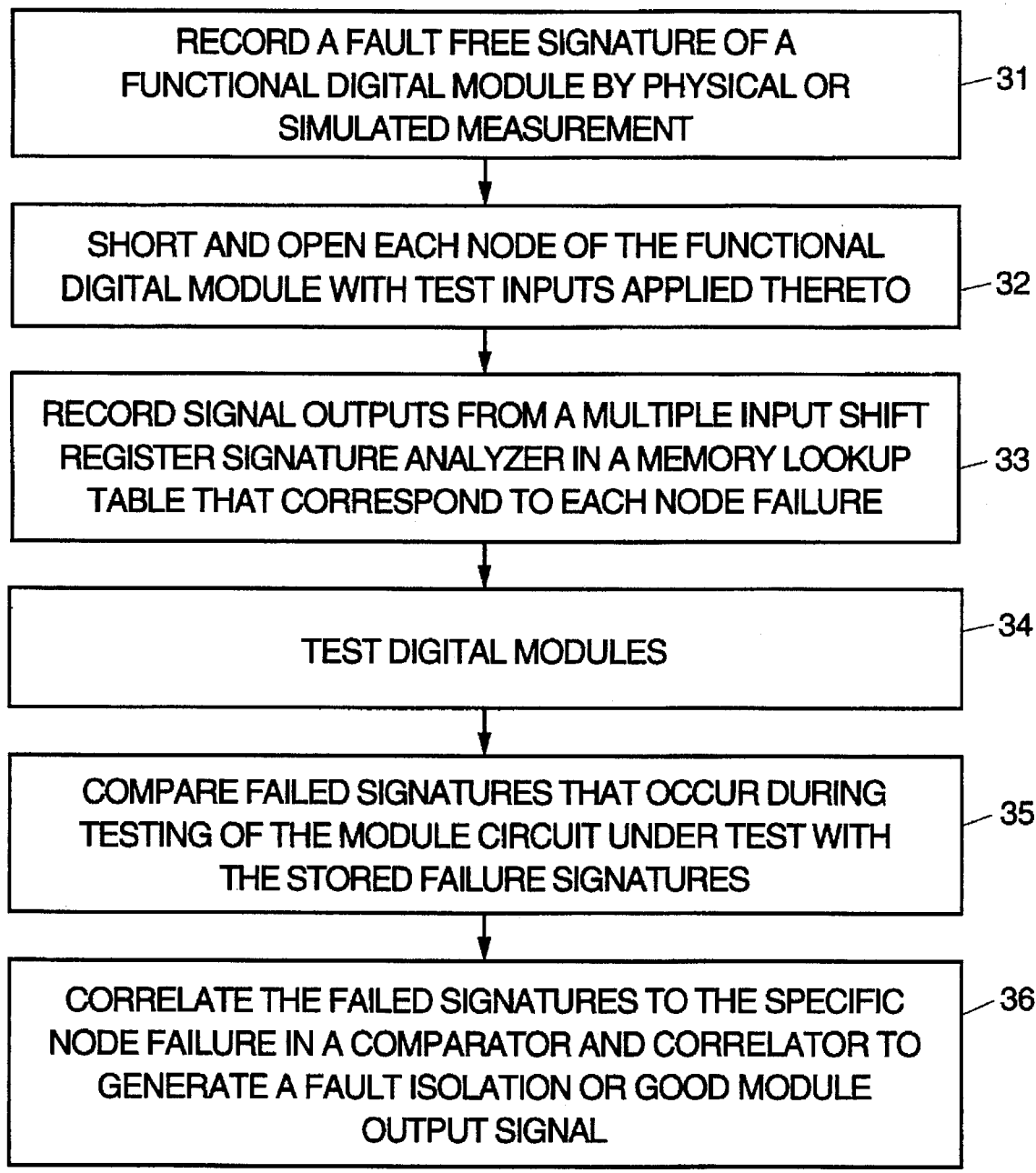

SIGNATURE ANALYSIS USAGE FOR FAULT ISOLATION

BACKGROUND

This invention relates generally to test equipment, and more particularly, to test equipment and test methods employing signature analysis to achieve fault isolation of digital modules.

There are three methods that are currently used for fault isolation in digital modules. These include manual isolation using a digital voltmeter, scope, and schematic as is done by commercial off-the-shelf suppliers. The second method is to use a fault dictionary along with expensive automatic test equipment. The third method uses guided probing that is directed by expensive automatic test equipment.

Manual isolation is time consuming and very costly in terms of labor expenses. Fault dictionary isolation is not accurate enough to isolate to a single bad node or part. Guided probing is not allowed in some applications (such as a Navy depot test, for example), and is not possible in some applications (such as temperature environments and new sealed chip on-board modules. It is also desirable to minimize the use of expensive automatic test equipment.

Accordingly, it is an objective of the present invention to provide for test equipment and test methods employing signature analysis to achieve fault isolation of digital modules.

SUMMARY OF THE INVENTION

To meet the above and other objectives, the present invention provides for test equipment and test methods employing signature analysis to achieve fault isolation of digital modules. The novelty of the approach of the present invention lies in the use of signature analysis for fault isolation, whereas in the past, signature analysis has been used for pass/fail determination. The present invention does not require expensive automatic test equipment as is required in existing methods two and three outlined above in the Background section.

Fault free signatures for a functional digital module are generated and are recorded in a lookup table memory or storage device. Next, all of the circuit nodes in the functional digital module are shorted and opened (either physically or by simulation) and each of their resulting faulty signatures and corresponding faulty nodes are recorded in the lookup table memory or storage device. The recorded signatures are used for subsequent pass/fail determination of digital modules that are tested.

Test inputs from any source (either on-board the module or external thereto) are applied to a digital module under test. Output signals and test points of the digital module under test are applied to the multiple input shift register signal analyzer. The multiple input shift register signal analyzer performs pass/fail signature analysis in response to output signals and test points of the digital module under test. When a failure occurs during testing of the digital module under test, comparator circuitry is used to find a match between the faulty signature and one of the stored signatures. A message is sent as an output from the comparator circuitry identifying the failed node so that the digital module under test can be repaired, or indicates that the module under test is functional.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 illustrates test methodology employed with the test equipment of FIGS. 1 and 2.

DETAILED DESCRIPTION

Figure 1:
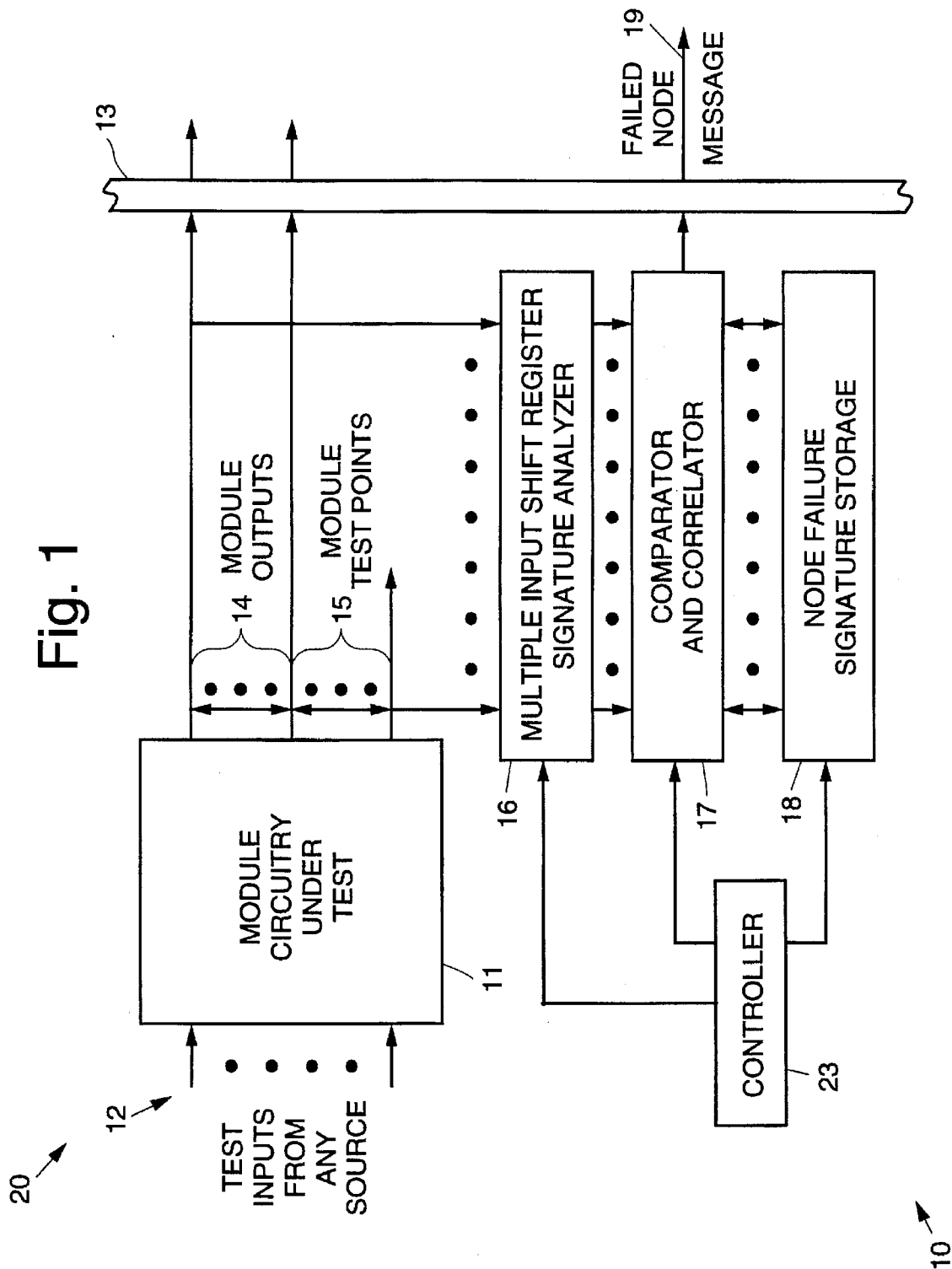
FIG. 1 shows a first embodiment of test equipment in accordance with the principles of the present invention.
Figure 2:
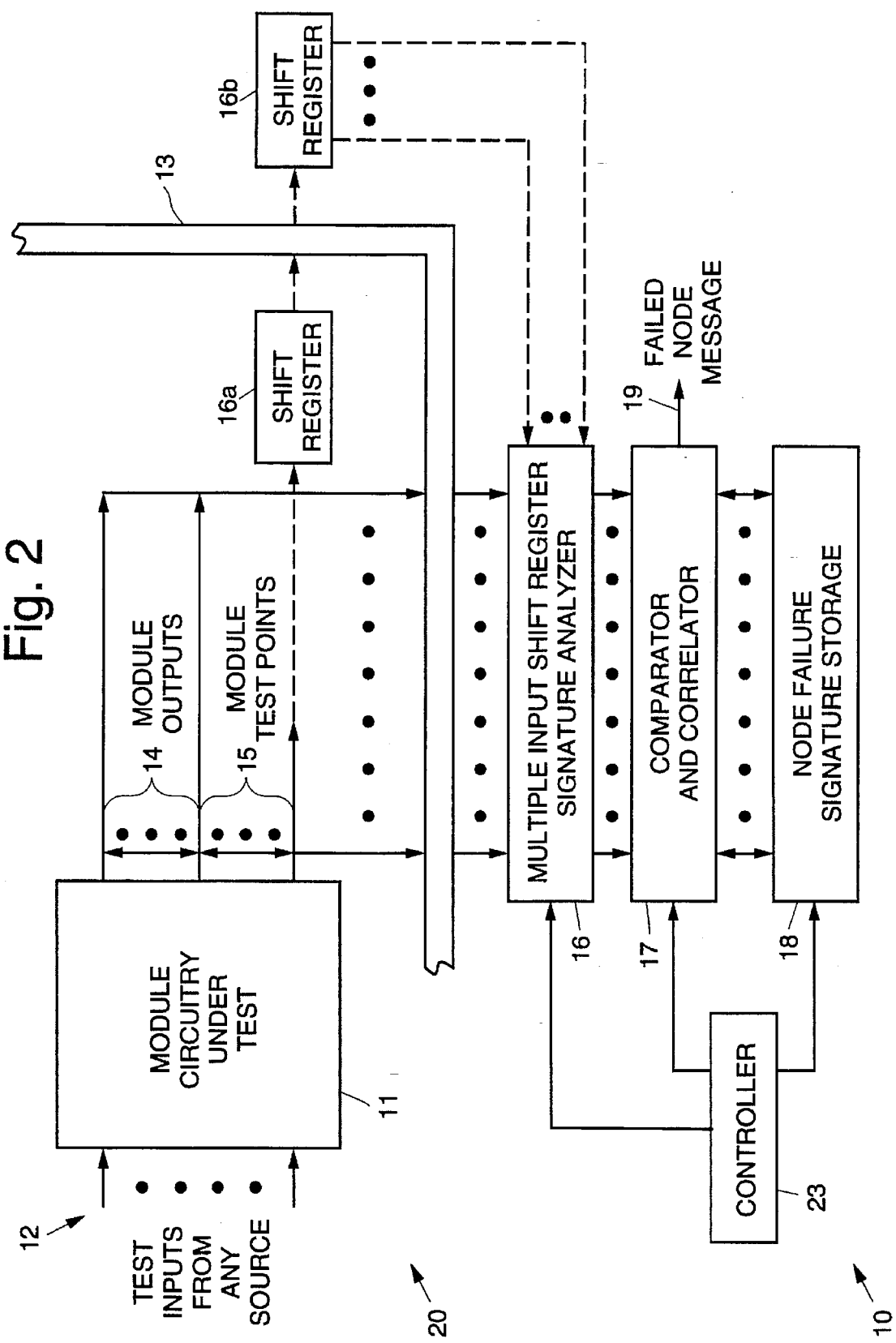
FIG. 2 shows a second embodiment of test equipment in accordance with the present invention.

Referring to the drawing figures, FIGS. 1 and 2 shows two embodiments of test equipment 10 in accordance with the principles of the present invention. The test equipment 10 shown in FIGS. 1 and 2 uses signature analysis to achieve fault isolation of digital module circuitry under test 11. FIG. 3 illustrates test methodology 30 employed using the test equipment 10 of FIGS. 1 and 2.

Referring to FIG. 1, it shows a digital module 20 that includes the digital module circuitry under test 11 and the present test equipment disposed on the module 20. The digital module circuitry under test 11 has a plurality of test inputs 12 derived from a test signal input source. Signal outputs 14 of the digital module circuitry under test 11 are sampled and monitored along with test points 15 of the digital module circuitry under test 11. The signal outputs 14 of the digital module circuitry under test 11 are coupled off of the module 11 by way of a module connector 13.

The test equipment 10 is shown as comprising part of the module 20 and includes a multiple input shift register signature analyzer 16, that is coupled to receive the signals derived from the module outputs 14 and module test points 15. A description of the multiple input shift register signature analyzer 16 is provided in a book entitled "Built-In Test for VLSI: Pseudorandom Techniques", by Paul H. Bardell et at, John Wiley & Sons, 1987, Chapter 5. Outputs of the multiple input shift register signature analyzer 16 are coupled to a comparator and correlator 17. Failed node messages 19, for example, are output from the comparator and correlator 17 and are coupled from the module 20 by way of the module connector 13. The comparator and correlator 17 is coupled to a node failure signature storage device 18 or memory lookup table 18. A controller 23 is coupled to the various components of the test equipment 10 that controls application of test input signals, movement of signals between the digital module circuitry under test 11, the multiple input shift register signature analyzer 16, the comparator and correlator 17, and the memory lookup table 18. This is done in a conventional manner well known to those in the digital signal processing art and will not be described in detail herein.

The signature storage device 18 stores or records a fault free signature from a functional digital module and faulty signatures obtained by shorting and opening each of the circuit nodes thereof. The faulty signatures are derived from physical measurement or simulation of all components thereof. The stored fault free signatures are used for comparison to signatures derived from the digital module circuitry under test 11 in the comparator and correlator 17.

The second embodiment of the test equipment 10 is shown in FIG. 2 which shows an embodiment wherein the signature analysis is performed external to the module 20 as part of a separate circuit, such as an application specific integrated circuit (ASIC), for example. The second embodiment of the test equipment 10 is configured in a substantially identical manner as the embodiment of FIG. 1, but in the second embodiment, the signal outputs 14 and test points 15 of the digital module circuitry under test 11 are coupled off of the module 20 by way of a multiple input, single output shift register 16a, the connector 13, and a single input, multiple output shift register 16b. Outputs of the multiple output shift register 16b are applied to inputs of the multiple input shift register signature analyzer 16.

The signature analysis and signal processing performed by the embodiments of the test equipment 10 shown in FIGS. 1 and 2 is substantially the same and will be described with reference to FIG. 3. More specifically, FIG. 3 illustrates test methodology 30 employed with the test equipment of FIGS. 1 and 2. The test methodology 30 comprises the following steps.

A fault free signature of a functional digital module is recorded and stored in the lookup table 18 that is derived from physical measurement or simulation of all components thereof thereto, illustrated by step 31. Test input signals are then applied to the digital module, and each internal node of the module circuitry under test 11 is shorted and opened either physically or by simulation with the test inputs 12 applied thereto, illustrated by step 32. Signal outputs from the multiple input shift register signature analyzer 16 that correspond to each node failure are recorded (stored) in the storage device 18 or memory lookup table 18, illustrated by step 33. This configures the test equipment 10. Then, digital module circuitry 11 is tested, illustrated by step 34.

During testing of the digital module circuitry under test 11, any faulty signatures are compared with the stored list of fault free and shorted and opened signatures in the comparator and correlator 17, illustrated by step 35. The failed signatures are then correlated to the specific node failure in the comparator and correlator 17, illustrated by step 36, and a failed part message is produced. If no failures occur, then a good module output signal or message is generated.

Other failures, such as adjacent pin shorts, and the like, may be tested using the present method 30, limited only by the size of the multiple input shift register signature analyzer 16 and the signature storage device 18 or memory lookup table 18. If the number of test points 15 exceed the capacity of the connector 13, the test points 15 may be serially scanned out of the circuitry under test 11 as required by a user using shift registers 16a, 16b respectively coupled between the digital module circuitry under test 11 and the connector 13 and from the connector 13 and the multiple input shift register signature analyzer 16.

The present invention allows fault isolation to a failed module node without lengthy physical probing. This capability is more critical with circuits made using newly developed technologies such as sealed-chip on-board modules where physical probing may not be feasible. In addition, the present invention allows fault isolation without expensive module test equipment. Isolation may be done at the unit or system level, even during temperature tests. For the case where test inputs are generated on the module, the present invention provides a cost-effective way to achieve vertical test commonality at the module, unit and system levels. This avoids the cost of developing separate tests at these levels. Common tests across levels also minimize test situations that cannot be verified. Manufacturing test costs are significantly reduced in light of the advantages provided by the present invention. Field test costs are also reduced, which increases customer satisfaction.

The present invention may be produced in the form of a standardized ASIC design having the signature analysis circuitry embedded therein. The present invention may be used by commercial off-the-shelf circuit board suppliers who currently perform manual fault isolation because the high cost of automatic test equipment cannot be justified.

Thus, test equipment and test methods employing signature analysis to achieve fault isolation of digital modules have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A test method for providing fault isolation of digital module circuitry under test that comprises a plurality of test signal inputs for receiving test input signals, a plurality of signal outputs, and a plurality of test points, said test method comprising steps of:

recording a fault free signature of a functional digital module that comprises circuitry that is substantially identical to the digital module circuitry under test;

shorting and opening every node of the functional digital module with test input signals applied to signal inputs thereof;

applying output signals of the functional digital module to a multiple input shift register and signature analyzer and recording signal outputs from said multiple input shift register and signature analyzer in a memory lookup table, which recorded signal outputs correspond to recorded failure signatures of the functional digital module;

testing the digital module circuitry under test;

comparing failure signatures that occur during testing of the digital module circuitry under test with the recorded failure signatures derived from the functional digital module; and correlating the failed signatures to a specific node failure to generate a fault isolation output signal for the digital module circuitry under test.

2. The test method claim 1 wherein the step of shorting and opening every node of the functional digital module comprises the step of physically shorting and opening every node thereof with test inputs applied to the signal inputs thereof.

3. The test method claim 1 wherein the step of shorting and opening every node of the functional digital module comprises the step of shorting and opening by simulation every node with test inputs applied to the signal inputs thereof.

4. Test equipment for providing fault isolation of digital module circuitry under test, said digital module circuitry under test having a plurality of test signal inputs for receiving test input signals, a plurality of output signals, and a plurality of test points, said test equipment comprising:

a multiple input shift register signature analyzer coupled to received signals derived from output signals and module test points both of a functional digital module and of the digital module circuitry under test;

a memory lookup table for storing a fault free signature from the functional digital module and faulty signatures derived from shorting and opening each node of the digital module circuitry under test; and a comparator and correlator coupled to the multiple input shift register signature analyzer and to the memory lookup table for comparing faulty signatures that occur during testing of the digital module circuitry under test with the stored fault free signatures and for correlating failed signals to a specific node to generate and output a failed node message.

* * * * *